Mar. 5, 1929.  O. H. GOETZ  1,703,930
AUTOMOBILE BUMPER
Filed Dec. 14, 1926
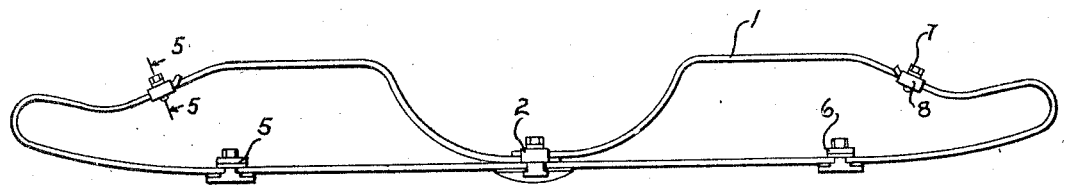
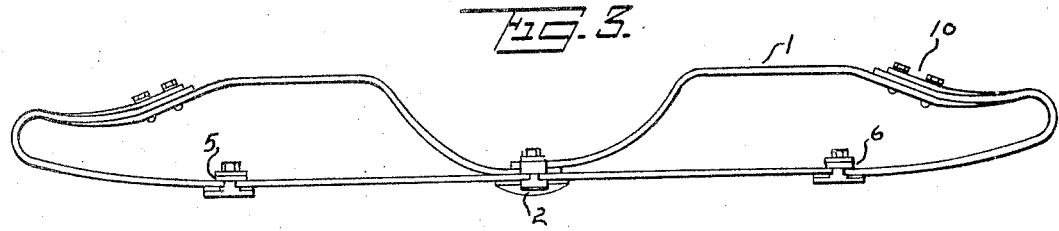
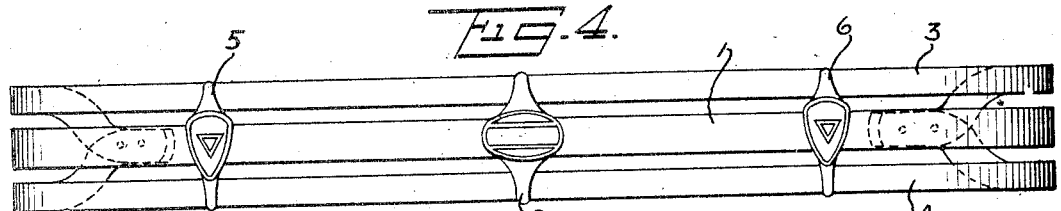
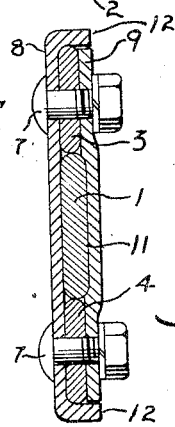
INVENTOR
Oscar H. Goetz.
BY
ATTORNEY Patented Mar. 5, 1929.

1,703,930

UNITED STATES PATENT OFFICE.

OSCAR H. GOETZ, OF CHICAGO, ILLINOIS, ASSIGNOR TO AMERICAN CHAIN COMPANY, INC., A CORPORATION OF NEW YORK.

AUTOMOBILE BUMPER.

Application filed December 14, 1926. Serial No. 154,725.

This invention relates to automobile bumpers and more particularly to a multi-bar bumper having as a main element a loop end bumper bar constructed entirely in one horizontal plane and having a front impact portion and a rearwardly positioned attaching portion, the bumper comprising also a plurality of auxiliary impact bars supported by, and in parallelism with, said front portion of the main bar serving to widen the impact surface of the bumper.

An object of the invention is the provision of a bumper of the above type having the auxiliary bars, edge bent toward, and vertically aligned with, the rear portion of the main bar, and connected therewith.

Among other objects is the provision of a bumper with auxiliary bars having the loop ends edge bent, overlapped and bolted to the rear portion of the main bar.

A further object is to produce a bumper of a multi-bar type of exceptional strength at an expense very little in excess of the main element but with all the advantages of other bumpers of a more elaborate and costly construction.

A clear conception of the construction and further objects of the invention may be had from the following specification in conjunction with the accompanying drawings in which:

Fig. 1 shows a plan view of the preferred form of bumper.

Fig. 2 is a front view of Fig. 1.

Fig. 3 is a plan view of a modified form of the bumper.

Fig. 4 is a front view of Fig. 3; and

Fig. 5 is a cross-section at 5—5 on Fig. 1.

The now preferred form of the invention shown in Fig. 1 comprises a main bar 1, constructed in a horizontal plane, having loop ends, the continuations of which are each bent forward in an arc as shown, and held in a clamp 2 at the center of the impact portion. The bumper also comprises auxiliary bars 3 and 4 supported and held in parallelism with the main bar 1 by clamps 2, 5 and 6. The auxiliary bars 3 and 4 have loop ends of substantially the same curvature as those of the main bar 1. The continuation of the loop ends of bars 3 and 4 are edge bent as shown until the adjacent edges of the three bars meet, or are closely adjacent. Holes are drilled through the ends of bars 3 and 4 to accommodate the bolts 7. A clamp is provided, preferably of the form shown in cross-section in Fig. 5, having a C-shaped face plate 8 placed around the ends of bars 3 and 4 and a portion of the main bar 1 and a rear plate 9 is bolted thereto by means of bolts 7 passing through the holes mentioned above. The rear plate 9 is formed with a recess at 11 for holding the main bar 1 and vertically aligning the ends of bars 3 and 4 with respect to the main bar, the lips 12 aiding to confine the bars.

A modified form of bumper is shown in Fig. 3, and is of substantially the same shape as that already described, with the exception that the continuation of the loop ends of bars 3 and 4 are edge bent until they are in horizontal alignment with main bar 1. These ends are then bolted to the main bar 1 by means of two bolts passing through the three bars as shown at 10 in Fig. 3.

It is apparent that this type of bumper is simple and inexpensive to manufacture and also provides a strong structure, due to its loop ends, said ends also guarding against hooking from the rear.

I claim:

1. An automobile bumper comprising as a main element a complete loop end bumper bar, a pair of auxiliary bars having loop ends thereon, said bars being vertically aligned with and supported by said main bar and said loop ends of said auxiliary bars being bent toward the plane of said main bar and secured to the rear portion of said main bar.

2. An automobile bumper comprising as a main element a complete loop end bumper bar, a pair of auxiliary bumper bars having loop ends of substantially the same curvature as said loop ends of said main bumper bar, said auxiliary bars being vertically aligned and supported by said main bar to form therewith a vertically extended impact section, and the ends of said auxiliary bars being edge bent and clamped in vertical alignment with the rear portion of said main bar.

3. An automobile bumper comprising as a main element a complete loop end bumper bar, a pair of auxiliary bumper bars having loop ends of substantially the same curvature as said loop ends of said main bumper bar, said auxiliary bars being vertically aligned and supported by said main bar to form therewith a vertically extended impact section, and the ends of said auxiliary bars being edge bent and bolted in a clamp in vertical alignment with the rear portion of said main bar.

4. An automobile bumper comprising as a main element a complete loop end bumper bar, a pair of auxiliary bumper bars having loop ends of substantially the same curvature as said loop ends of said main bumper bar, said auxiliary bars being vertically aligned and supported by said main bar to form therewith a vertically extended impact section and the ends of said auxiliary bars being edge bent in a clamp in vertical alignment with the rear portion of said main bar, said clamp comprising a face plate of sufficient length to contain the ends of said auxiliary bars and said rear portion of said main bar in vertical alignment, a rear plate, and a pair of bolts passing through the face plate, the ends of said auxiliary bars and rear plate to form an integral joint.

5. An automobile bumper comprising as a main element a complete loop end bumper bar, a pair of auxiliary bars having loop ends thereon, said bars being vertically aligned with and supported by said main bar to form therewith a vertically extended impact section, said loop ends of said auxiliary bars being each connected to the rear portion of said main bar by a cross-tie, and said main bar being connected to said impact section at the central region thereof.

In testimony whereof I have signed this specification.

OSCAR H. GOETZ.